United States Patent [19]
Koizumi et al.

[11] 4,101,204
[45] Jul. 18, 1978

[54] MEDIUM MAGNIFICATION OBJECTIVE FOR VIDEO DISKS

[75] Inventors: Toshimichi Koizumi, Sagamihara; Miwako Unami, Yokohama, both of Japan

[73] Assignee: Olympus Optical Co., Ltd., Japan

[21] Appl. No.: 771,801

[22] Filed: Feb. 24, 1977

[30] Foreign Application Priority Data

Feb. 27, 1976 [JP] Japan .................................. 51-20147

[51] Int. Cl.² ............................................... G02B 9/34
[52] U.S. Cl. ............................... 350/224; 350/175 ML
[58] Field of Search ......................... 350/224, 175 ML

[56] References Cited

U.S. PATENT DOCUMENTS

| 3,659,924 | 5/1972 | Shoemaker | 350/224 |
| 3,982,821 | 9/1976 | Shoemaker | 350/224 |

*Primary Examiner*—Conrad J. Clark
*Attorney, Agent, or Firm*—Cushman, Darby & Cushman

[57] ABSTRACT

A medium magnification objective for video disks comprising four single lenses for which the number of lenses constituting the objective is small, the working distance is large and flatness of image is high.

7 Claims, 25 Drawing Figures

FIG. 1

FIG. 2A SPHERICAL ABERRATION

FIG. 2B SINE CONDITION

FIG. 2C ASTIGMATISM

FIG. 2D DISTORTION

| FIG. 4A | FIG. 4B | FIG. 4C | FIG. 4D |
|---|---|---|---|
| SPHERICAL ABERRATION | SINE CONDITION | ASTIGMATISM | DISTORTION |

N.A 0.45

Yo = 0.05
Δm — Δs

-1  0  1
mm

-0.001  0.001

-1  0  1
mm

-2  0  2
%

FIG. 5A — SPHERICAL ABERRATION N.A 0.45

-1 0 1
mm

FIG. 5 — SINE CONDITION

-0.001 0.001

FIG. 5C — ASTIGMATISM Yo = 0.05

Δm --- Δs
-1 0 1
mm

FIG. 5D — DISTORTION

SPHERICAL ABERRATION

SINE CONDITION

ASTIGMATISM

DISTORTION

-2 0 2
%

MEDIUM MAGNIFICATION OBJECTIVE FOR VIDEO DISKS

BACKGROUND OF THE INVENTION (a) Field of the Invention

The present invention relates to a medium magnification objective for video disks and, more particularly, to a medium magnification objective for reading out the signals recorded on high-density information-recording disks (video disks).

(b) Description of the Prior Art

For objectives to be used in reproducing systems for video disks, it is required to warrant resolving power of 1μ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda = 632.8$ mm), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

SUMMARY OF THE INVENTION

It is, therefore, a primary object of the present invention to provide a medium magnification objective for video disks for which the working distance is large, flatness of image is high and resolving power is high.

Figure 1:
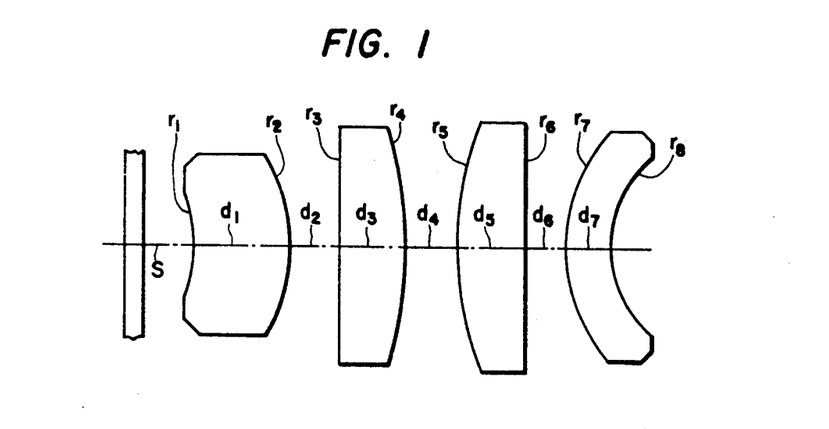
FIG. 1 shows a sectional view of the objective for video disks according to the present invention.
Figures 2A, 2B:
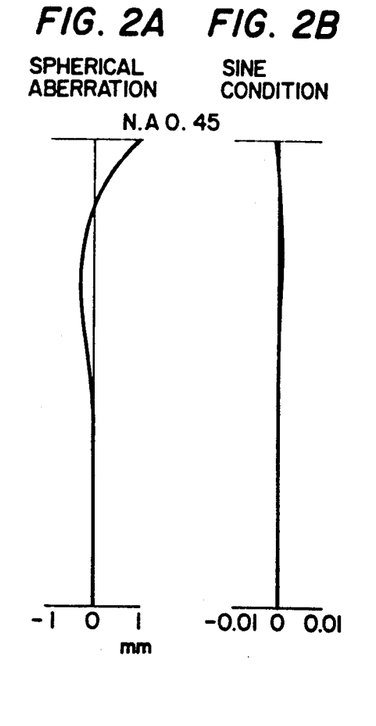
FIGS. 2A, 2B, 2C and 2D respectively show graphs illustrating aberration curves of Embodiment 1.
Figure 2C:
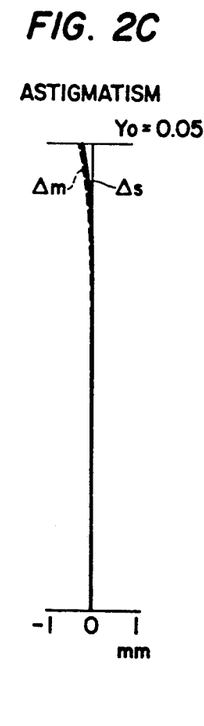
Figure 2D:
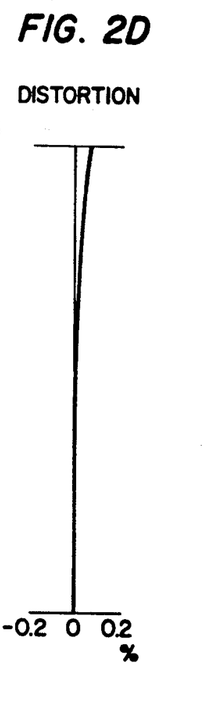
Figure 3A:
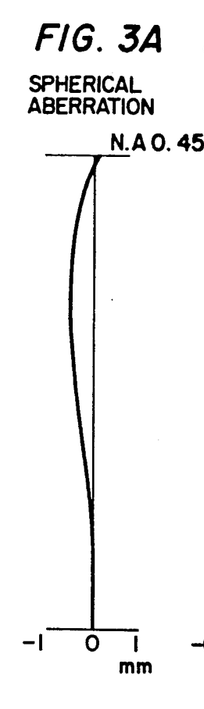
FIGS. 3A, 3B, 3C and 3D respectively show graphs illustrating aberration curves of Embodiment 2.
Figure 3B:
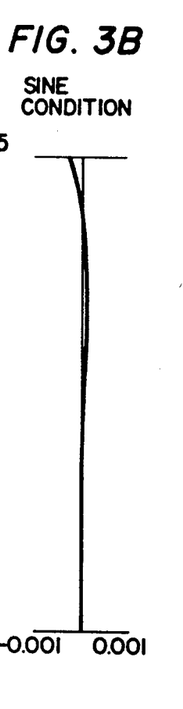
Figure 3C:
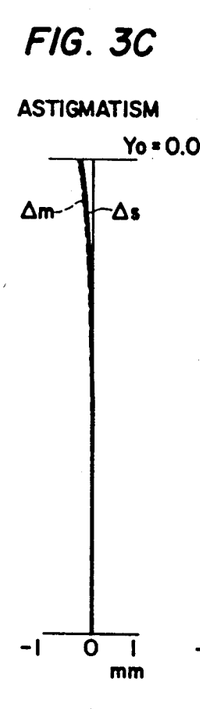
Figure 3D:
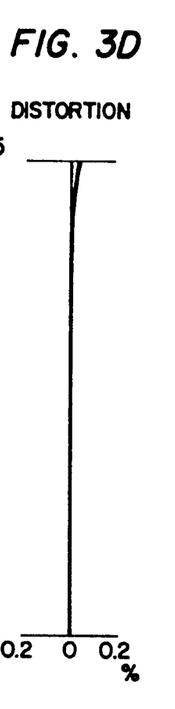
Figure 4A:
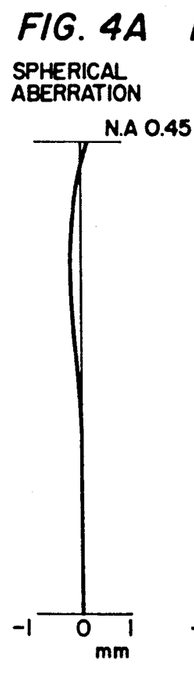
FIGS. 4A, 4B, 4C and 4D respectively show graphs illustrating aberration curves of Embodiment 3.
Figure 4B:
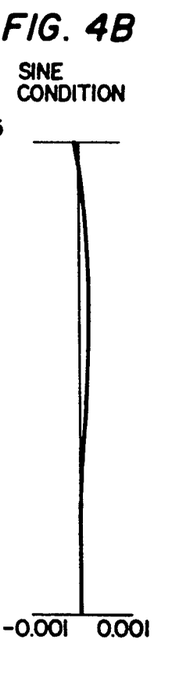
Figure 4C:
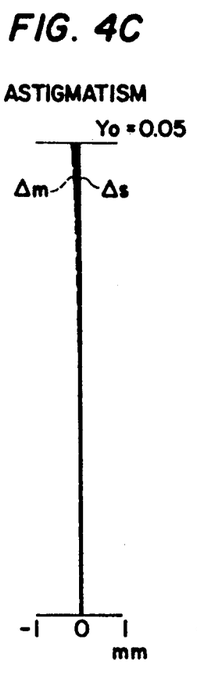
Figure 4D:
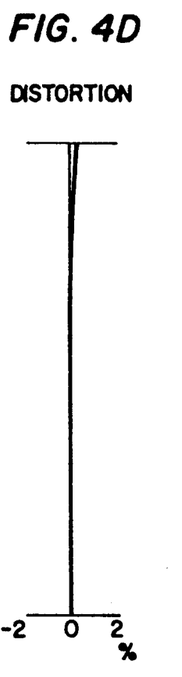
Figure 5:
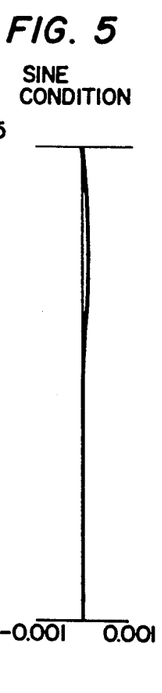
FIGS. 5A, 5B, 5C and 5D respectively show graphs illustrating aberration curves of Embodiment 4.
Figure 5A:
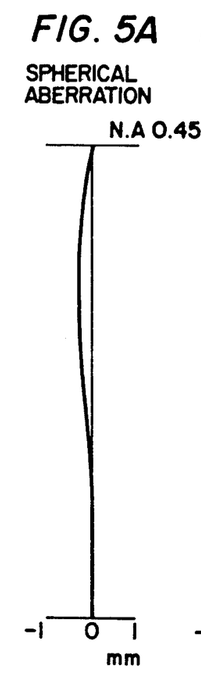
Figures 5C, 5D:
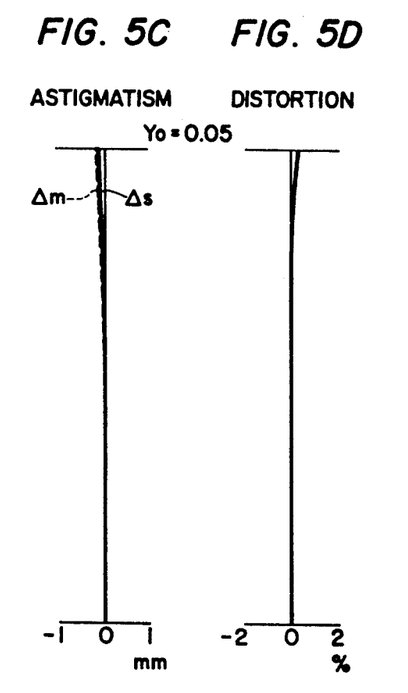
Figures 6A, 6B:
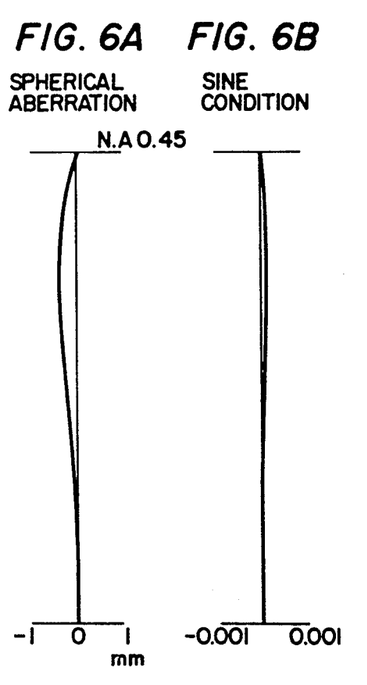
FIGS. 6A, 6B, 6C and 6D respectively show graphs illustrating aberration curves of Embodiment 5.
Figure 6C:
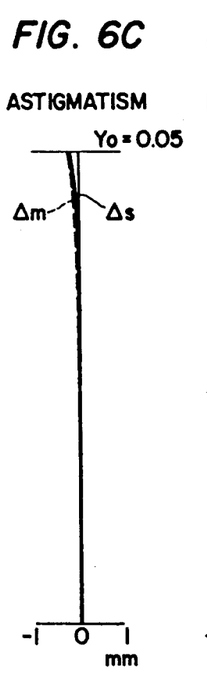
Figure 6D:
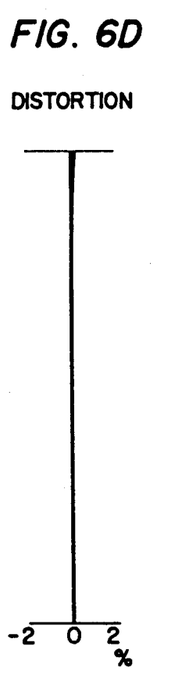
Figure 7A:
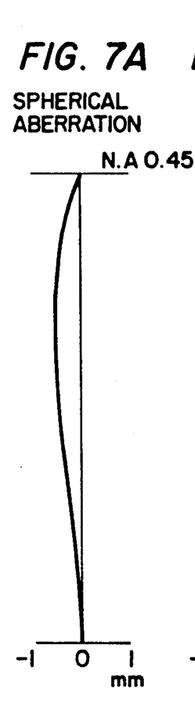
FIGS. 7A, 7B, 7C and 7D respectively show graphs illustrating aberration curves of Embodiment 6.
Figure 7B:
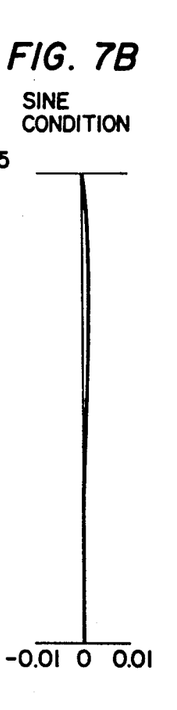
Figure 7C:
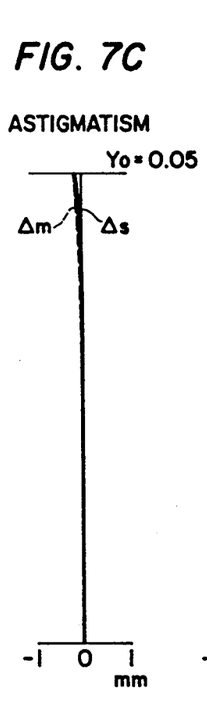
Figure 7D:
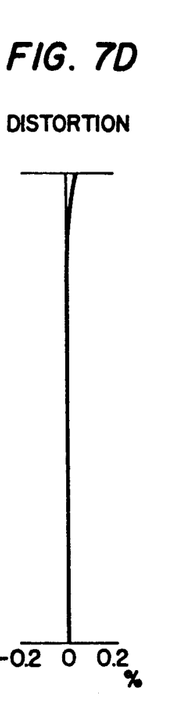

The objective for video disks according to the present invention comprises four single lenses, i.e., a first, second third and fourth lenses as shown in FIG. 1. The first lens is a positive meniscus lens with its concave surface positioned toward the object side, the second lens is a positive meniscus lens with its concave surface positioned toward the object side, the third lens is a biconvex lens, and the fourth lens is a negative meniscus lens with its convex surface positioned toward the object side. Besides, the objective for video disks according to the present invention satisfies the following conditions when reference symbol $r_2$ represents the radius of curvature of the surface on the image side of the first lens, reference symbol $d_1$ represents the thickness of the first lens, reference symbol $d_7$ represents the thickness of the fourth lens, reference symbol $d_4$ represents the airspace between the second and third lenses, reference symbol $d_6$ represents the airspace between the third and fourth lenses, reference symbol $f_1$ represents the focal length of the first lens, reference symbol $f_4$ represents the focal length of the fourth lens and reference symbol $f$ represents the focal length of the lens system as a whole.

$$0.3 \geq d_6/f \geq 0.06 \quad (1)$$

$$0.41 \geq d_7/f \geq 0.28 \quad (2)$$

$$2 \geq |f_4|/f_1 \geq 1 \quad (3)$$

$$0.45 \geq d_4/f \geq 0.25 \quad (4)$$

$$1.7 \geq |r_2|/d_1 \geq 1.5 \quad (5)$$

Now, the above conditions are explained below. When $d_6/f$ becomes $0.3 < d_6/f$ in the condition (1), spherical aberration will be undercorrected in the marginal portion and coma caused by offaxial rays will become asymmetrical. When it becomes $0.06 > d_6/f$, spherical aberration will be overcorrected and the astigmatic difference will become large.

When $d_7/f$ becomes $0.41 < d_7/f$ in the condition (2), spherical aberration will be undercorrected especially in the zonal portion, astigmatism especially meridional astigmatism will be overcorrected and the astimatic difference will become large. When it becomes $0.28 > d_7/f$, spherical aberration will be overcorrected, astigmatism especially meridional astigmatism will be undercorrected and the astigmatic difference will become large.

If it becomes $2 < |f_4|/f_1$ in the condition (3), asymmetry of coma will be aggravated and will not be balanced with the other aberrations. When it becomes $1 > |f_4|/f_1$, spherical aberration will be overcorrected especially in the marginal portion, astigmatism will be undercorrected and it becomes impossible to correct the astigmatic difference favorably.

When $d_4/f$ becomes $0.45 < d_4/f$ in the condition (4), spherical aberration will tend to be undercorrected in the zonal portion though the astigmatic difference becomes small. When it becomes $0.25 > d_4/f$, the astigmatic difference will become large and asymmetry of coma will be considerably aggravated. As explained above, it is advantageous for correction of astigmatism when the airspace $d_4$ is made larger. When, however, $d_4$ is made larger, the back focal point of the lens system is shifted toward the lens system. Therefore, it is not possible to make $d_4$ very large when it is so required to shift the back focal point toward the image side of the fourth lens, i.e., the lens closest to the image. Therefore, the condition (4) is necessary also for shifting the back focal point toward the image side of the lens system and, at the same time, for correcting astigmatism favorably.

If it becomes $1.7 < |r_2|/d_1$ in the condition (5), spherical aberration will be undercorrected in the zonal portion and asymmetry of coma will be caused. If it becomes $1.5 > |r_2|/d_1$, spherical aberration will be somewhat overcorrected in the marginal portion and the astigmatic difference will become large.

DETAILED DESCRIPTION OF THE PREFERRED EMBODIMENTS

Preferred embodiments of the medium magnification objective for video disks according to the present invention are as shown below.

| | Embodiment 1 | | |
|---|---|---|---|
| $f = 1$ | N.A. = 0.45 | | |
| $r_1 = -0.8326$ | | | |
| $d_1 = 0.535$ | $n_1 = 1.7231$ | $\nu_1 = 28.5$ | |
| $r_2 = -0.8283$ | | | |
| $d_2 = 0.265$ | | | |
| $r_3 = -85.6671$ | | | |
| $d_3 = 0.457$ | $n_2 = 1.6166$ | $\nu_2 = 36.3$ | |
| $r_4 = -2.0231$ | | | |
| $d_4 = 0.295$ | | | |
| $r_5 = 1.7164$ | | | |
| $d_5 = 0.398$ | $n_3 = 1.6166$ | $\nu_3 = 36.3$ | |
| $r_6 = -10.4009$ | | | |
| $d_6 = 0.064$ | | | |
| $r_7 = 1.0055$ | | | |
| $d_7 = 0.288$ | $n_4 = 1.7231$ | $\nu_4 = 28.5$ | |
| $r_8 = 0.6846$ | | | |
| $s = 0.33$, | $\beta = -20x$, | $\Sigma P = 0.032$ | |
| $f_1 = 4.17$, | $f_4 = -4.762$ | | |

| | Embodiment 2 | | |
|---|---|---|---|
| $f = 1$ | N.A. = 0.45 | | |
| $r_1 = -0.9048$ | | | |
| $d_1 = 0.507$ | $n_1 = 1.7231$ | $\nu_1 = 28.5$ | |
| $r_2 = -0.8451$ | | | |
| $d_2 = 0.297$ | | | |
| $r_3 = -11.1551$ | | | |
| $d_3 = 0.507$ | $n_2 = 1.6166$ | $\nu_2 = 36.3$ | |
| $r_4 = -1.9235$ | | | |
| $d_4 = 0.257$ | | | |
| $r_5 = 2.4538$ | | | |
| $d_5 = 0.396$ | $n_3 = 1.6166$ | $\nu_3 = 36.3$ | |
| $r_6 = -4.642$ | | | |
| $d_6 = 0.185$ | | | |
| $r_7 = 1.0035$ | | | |
| $d_7 = 0.381$ | $n_4 = 1.7231$ | $\nu_4 = 28.5$ | |
| $r_8 = 0.6965$ | | | |
| $s = 0.33$, | $\beta = -20x$, | $\Sigma P = 0.032$ | |
| $f_1 = 3.879$, | $f_4 = -6.56$ | | |

| | Embodiment 3 | | |
|---|---|---|---|
| $f = 1$ | N.A. = 0.45 | | |
| $r_1 = -0.8616$ | | | |
| $d_1 = 0.503$ | $n_1 = 1.7497$ | $\nu_1 = 27.5$ | |
| $r_2 = -0.8248$ | | | |
| $d_2 = 0.322$ | | | |
| $r_3 = -27.9821$ | | | |
| $d_3 = 0.471$ | $n_2 = 1.6166$ | $\nu_2 = 36.3$ | |
| $r_4 = -1.9191$ | | | |
| $d_4 = 0.39$ | | | |
| $r_5 = 2.3862$ | | | |
| $d_5 = 0.393$ | $n_3 = 1.6166$ | $\nu_3 = 36.3$ | |
| $r_6 = -5.6509$ | | | |
| $d_6 = 0.205$ | | | |
| $r_7 = 1.0662$ | | | |
| $d_7 = 0.378$ | $n_4 = 1.7231$ | $\nu_4 = 28.5$ | |
| $r_8 = 0.7275$ | | | |
| $s = 0.327$, | $\beta = -20x$, | $\Sigma P = 0.032$ | |
| $f_1 = 3.757$, | $f_4 = -5.953$ | | |

| | Embodiment 4 | | |
|---|---|---|---|
| $f = 1$ | N.A. = 0.45 | | |
| $r_1 = -0.9317$ | | | |
| $d_1 = 0.532$ | $n_1 = 1.7561$ | $\nu_1 = 26.6$ | |
| $r_2 = -0.8683$ | | | |
| $d_2 = 0.265$ | | | |
| $r_3 = -16.8908$ | | | |
| $d_3 = 0.466$ | $n_2 = 1.6327$ | $\nu_2 = 35.4$ | |
| $r_4 = -1.9384$ | | | |
| $d_4 = 0.394$ | | | |
| $r_5 = 2.9783$ | | | |
| $d_5 = 0.355$ | $n_3 = 1.6166$ | $\nu_3 = 36.3$ | |
| $r_6 = -4.1192$ | | | |
| $d_6 = 0.221$ | | | |
| $r_7 = 1.0517$ | | | |
| $d_7 = 0.395$ | $n_4 = 1.7561$ | $\nu_4 = 26.6$ | |
| $r_8 = 0.7352$ | | | |
| $s = 0.329$, | $\beta = -20x$, | $\Sigma P = 0.032$ | |
| $f_1 = 3.704$, | $f_4 = -7.09$ | | |

| | Embodiment 5 | | |
|---|---|---|---|
| $f = 1$ | N.A. = 0.45 | | |
| $r_1 = -1.0936$ | | | |
| $d_1 = 0.593$ | $n_1 = 1.7561$ | $\nu_1 = 26.6$ | |
| $r_2 = -0.9635$ | | | |
| $d_2 = 0.174$ | | | |
| $r_3 = -13.7056$ | | | |
| $d_3 = 0.503$ | $n_2 = 1.6166$ | $\nu_2 = 36.3$ | |
| $r_4 = -2.0513$ | | | |
| $d_4 = 0.322$ | | | |
| $r_5 = 2.4599$ | | | |
| $d_5 = 0.278$ | $n_3 = 1.6166$ | $\nu_3 = 36.3$ | |
| $r_6 = -4.9906$ | | | |
| $d_6 = 0.271$ | | | |
| $r_7 = 1.0123$ | | | |
| $d_7 = 0.361$ | $n_4 = 1.7561$ | $\nu_4 = 26.6$ | |
| $r_8 = 0.7078$ | | | |
| $s = 0.368$, | $\beta = -20x$, | $\Sigma P = 0.034$ | |
| $f_1 = 3.616$, | $f_4 = -6.359$ | | |

| | Embodiment 6 | | |
|---|---|---|---|
| $f = 1$ | N.A. = 0.45 | | |
| $r_1 = -1.0997$ | | | |
| $d_1 = 0.596$ | $n_1 = 1.7561$ | $\nu_1 = 26.6$ | |
| $r_2 = -0.9662$ | | | |
| $d_2 = 0.156$ | | | |
| $r_3 = -13.7649$ | | | |
| $d_3 = 0.505$ | $n_2 = 1.6166$ | $\nu_2 = 36.3$ | |
| $r_4 = -2.0638$ | | | |
| $d_4 = 0.324$ | | | |
| $r_5 = 2.4728$ | | | |
| $d_5 = 0.279$ | $n_3 = 1.6166$ | $\nu_3 = 36.3$ | |
| $r_6 = -5.0205$ | | | |
| $d_6 = 0.272$ | | | |
| $r_7 = 1.0176$ | | | |
| $d_7 = 0.363$ | $n_4 = 1.7561$ | $\nu_4 = 26.6$ | |
| $r_8 = 0.712$ | | | |
| $s = 0.364$, | $\beta = -20x$, | $\Sigma P = 0.033$ | |
| $f_1 = 3.6$, | $f_4 = -6.416$ | | |

In the above-mentioned respective embodiments, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses for $d$-line, reference symbol S represents the working distance of the lens system, reference symbol $\beta$ represents magnification and reference symbol $\Sigma P$ represents Petzval's sum.

We claim:
1. A medium magnification objective for video disks comprising a first, second, third and fourth lenses, said first lens being a positive meniscus lens with its concave surface positioned toward the object side, said second lens being a positive meniscus lens with its concave surface positioned toward the object side, said third lens being a biconvex lens, said fourth lens being a negative meniscus lens with its convex surface positioned toward the object side, said medium magnification objective for video disks satisfying the following conditions:

$$0.3 \geq d_6/f \geq 0.06 \quad (1)$$

$$0.41 \geq d_7/f \geq 0.28 \quad (2)$$

$$2 \geq |f_4|/f_1 \geq 1 \quad (3)$$

$$0.45 \geq d_4/f \geq 0.25 \quad (4)$$

$$1.7 \geq |r_2|/d_1 \geq 1.5 \quad (5)$$

Wherein reference symbol $r_2$ represents the radius of curvature of the surface on the image side of the first lens, reference symbol $d_1$ represent the thickness of the first lens, reference symbol $d_7$ represents the thickness of the fourth lens, reference symbol $d_4$ represents the airspace between the second and third lenses, reference $d_6$ represents the airspace between the third and fourth lenses, reference symbol $f_1$ represents the focal length of the first lens, reference $f_4$ represents the focal length of the fourth lens and reference symbol $f$ represents the focal length of the lens system as a whole.

2. A medium magnification objective for video disks according to claim 1, in which said medium magnification objective for video disks has the following numerical data:

| $f = 1$ | | N.A. $= 0.45$ | |
|---|---|---|---|
| $r_1 = -0.8326$ | | | |
| | $d_1 = 0.535$ | $n_1 = 1.7231$ | $\nu_1 = 28.5$ |
| $r_2 = -0.8283$ | | | |
| | $d_2 = 0.265$ | | |
| $r_3 = -85.6671$ | | | |
| | $d_3 = 0.457$ | $n_2 = 1.6166$ | $\nu_2 = 36.3$ |
| $r_4 = -2.0231$ | | | |
| | $d_4 = 0.295$ | | |
| $r_5 = 1.7164$ | | | |
| | $d_5 = 0.398$ | $n_3 = 1.6166$ | $\nu_3 = 36.3$ |
| $r_6 = -10.4009$ | | | |
| | $d_6 = 0.064$ | | |
| $r_7 = 1.0055$ | | | |
| | $d_7 = 0.288$ | $n_4 = 1.7231$ | $\nu_4 = 28.5$ |
| $r_8 = 0.6846$ | | | |
| $s = 0.33$, | | $\beta = -20x$, | $\Sigma P = 0.032$ |
| $f_1 = 4.17$, | | $f_4 = -4.762$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$ nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

3. A medium magnification objective for video disks according to claim 1, in which said medium magnification objective for video disks has the following numerical data:

| $f = 1$ | | N.A. $= 0.45$ | |
|---|---|---|---|
| $r_1 = -0.9048$ | | | |
| | $d_1 = 0.507$ | $n_1 = 1.7231$ | $\nu_1 = 28.5$ |
| $r_2 = -0.8451$ | | | |
| | $d_2 = 0.297$ | | |
| $r_3 = -11.1551$ | | | |
| | $d_3 = 0.507$ | $n_2 = 1.6166$ | $\nu_2 = 36.3$ |
| $r_4 = -1.9235$ | | | |
| | $d_4 = 0.257$ | | |
| $r_5 = 2.4538$ | | | |
| | $d_5 = 0.396$ | $n_3 = 1.6166$ | $\nu_3 = 36.3$ |
| $r_6 = -4.642$ | | | |
| | $d_6 = 0.185$ | | |
| $r_7 = 1.0035$ | | | |
| | $d_7 = 0.381$ | $n_4 = 1.7231$ | $\nu_4 = 28.5$ |
| $r_8 = 0.6965$ | | | |
| $s = 0.33$, | | $\beta = -20x$, | $\Sigma P = 0.032$ |
| $f_1 = 3.879$, | | $f_4 = -6.56$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$ nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

4. A medium magnification objective for video disks according to claim 1, in which said medium magnification objective for video disks has the following numerical data:

| $f = 1$ | | N.A. $= 0.45$ | |
|---|---|---|---|
| $r_1 = -0.8616$ | | | |
| | $d_1 = 0.503$ | $n_1 = 1.7497$ | $\nu_1 = 27.5$ |
| $r_2 = -0.8248$ | | | |
| | $d_2 = 0.322$ | | |
| $r_3 = -27.9821$ | | | |
| | $d_3 = 0.471$ | $n_2 = 1.6166$ | $\nu_2 = 36.3$ |
| $r_4 = -1.9191$ | | | |
| | $d_4 = 0.39$ | | |
| $r_5 = 2.3862$ | | | |
| | $d_5 = 0.393$ | $n_3 = 1.6166$ | $\nu_3 = 36.3$ |
| $r_6 = -5.6509$ | | | |
| | $d_6 = 0.205$ | | |
| $r_7 = 1.0662$ | | | |
| | $d_7 = 0.378$ | $n_4 = 1.7231$ | $\nu_4 = 28.5$ |
| $r_8 = 0.7275$ | | | |
| $s = 0.327$, | | $\beta = -20x$, | $\Sigma P = 0.032$ |
| $f_1 = 3.757$, | | $f_4 = -5.953$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$ nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

5. A medium magnification objective for video disks according to claim 1, in which said medium magnification objective for video disks has the following numerical data:

| f = 1 | | N.A. = 0.45 | |
|---|---|---|---|
| $r_1 = -0.9317$ | | | |
| | $d_1 = 0.532$ | $n_1 = 1.7561$ | $\nu_1 = 26.6$ |
| $r_2 = -0.8683$ | | | |
| | $d_2 = 0.265$ | | |
| $r_3 = -16.8908$ | | | |
| | $d_3 = 0.466$ | $n_2 = 1.6327$ | $\nu_2 = 35.4$ |
| $r_4 = -1.9384$ | | | |
| | $d_4 = 0.394$ | | |
| $r_5 = 2.9783$ | | | |
| | $d_5 = 0.355$ | $n_3 = 1.6166$ | $\nu_3 = 36.3$ |
| $r_6 = -4.1192$ | | | |
| | $d_6 = 0.221$ | | |
| $r_7 = 1.0517$ | | | |
| | $d_7 = 0.395$ | $n_4 = 1.7561$ | $\nu_4 = 26.6$ |
| $r_8 = 0.7352$ | | | |
| s = 0.329, | | $\beta = -20x$, | $\Sigma P = 0.032$ |
| $f_1 = 3.704$, | | $f_4 = -7.09$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

6. A medium magnification objective for video disks according to claim 1, in which said medium magnification objective for video disks has the following numerical data:

| f = 1 | | N.A. = 0.45 | |
|---|---|---|---|
| $r_1 = -1.0936$ | | | |
| | $d_1 = 0.593$ | $n_1 = 1.7561$ | $\nu_1 = 26.6$ |
| $r_2 = -0.9635$ | | | |
| | $d_2 = 0.174$ | | |
| $r_3 = -13.7056$ | | | |
| | $d_3 = 0.503$ | $n_2 = 1.6166$ | $\nu_2 = 36.3$ |
| $r_4 = -2.0513$ | | | |
| | $d_4 = 0.322$ | | |
| $r_5 = 2.4599$ | | | |
| | $d_5 = 0.278$ | $n_3 = 1.6166$ | $\nu_3 = 36.3$ |
| $r_6 = -4.9906$ | | | |
| | $d_6 = 0.271$ | | |
| $r_7 = 1.0123$ | | | |
| | $d_7 = 0.361$ | $n_4 = 1.7561$ | $\nu_4 = 26.6$ |
| $r_8 = 0.7078$ | | | |
| s = 0.368, | | $\beta = -20x$, | $\Sigma P = 0.034$ |
| $f_1 = 3.616$, | | $f_4 = -6.359$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

7. A medium magnification objective for video disks according to claim 1, in which said medium magnification objective for video disks has the following numerical data:

| f = 1 | | N.A. = 0.45 | |
|---|---|---|---|
| $r_1 = -1.0997$ | | | |
| | $d_1 = 0.596$ | $n_1 = 1.7561$ | $\nu_1 = 26.6$ |
| $r_2 = -0.9662$ | | | |
| | $d_2 = 0.156$ | | |
| $r_3 = -13.7649$ | | | |
| | $d_3 = 0.505$ | $n_2 = 1.6166$ | $\nu_2 = 36.3$ |
| $r_4 = -2.0638$ | | | |
| | $d_4 = 0.324$ | | |
| $r_5 = 2.4728$ | | | |
| | $d_5 = 0.279$ | $n_3 = 1.6166$ | $\nu_3 = 36.3$ |
| $r_6 = -5.0205$ | | | |
| | $d_6 = 0.272$ | | |
| $r_7 = 1.0176$ | | | |
| | $d_7 = 0.363$ | $n_4 = 1.7561$ | $\nu_4 = 26.6$ |
| $r_8 = 0.712$ | | | |
| s = 0.364, | | $\beta = -20x$, | $\Sigma P = 0.033$ |
| $f_1 = 3.6$, | | $f_4 = -6.416$ | |

Wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses for $d$-line, reference symbol S represents the working distance of the lens system, reference symbol $\beta$ represents magnification, reference symbol $\Sigma P$ represents Petzval's sum, reference symbol $f_1$ represents the focal length of the first lens, reference symbol $f_4$ represents the focal length of the fourth lens and reference symbol $f$ represents the focal length of the lens system as a whole.

* * * * *